Oct. 13, 1942.  C. D. AUSTIN  2,299,002
PHOTOGRAPHIC APPARATUS
Filed June 14, 1939   2 Sheets-Sheet 1
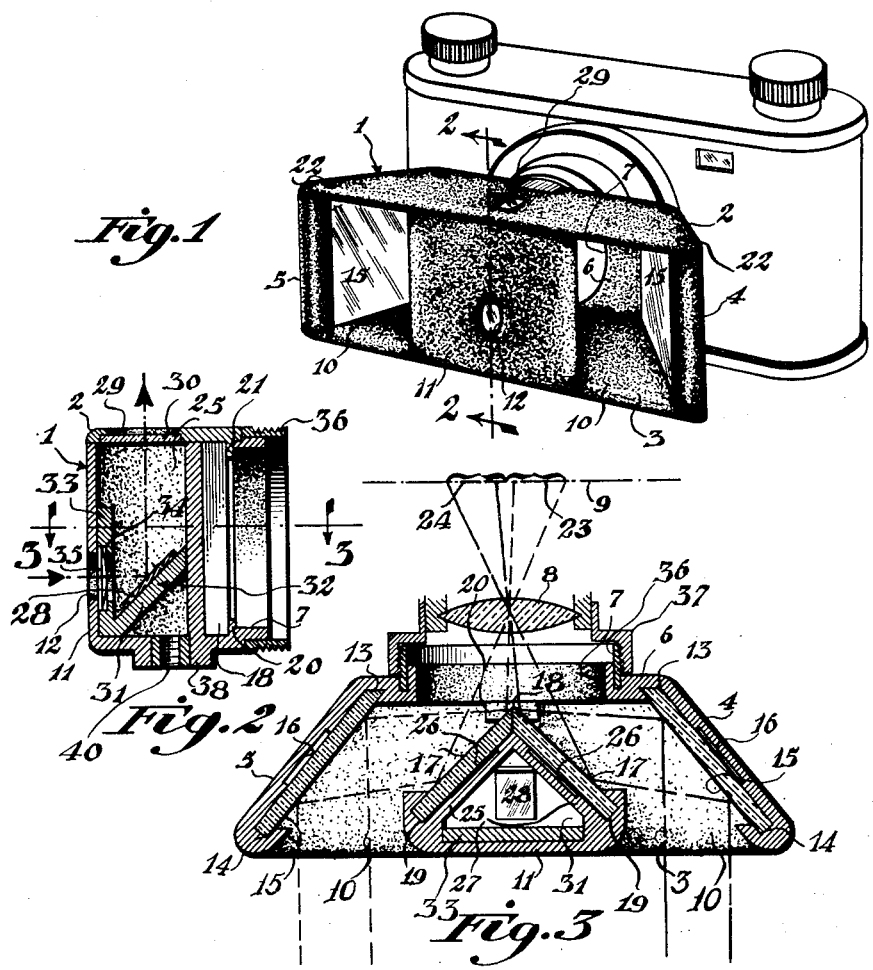

Oct. 13, 1942.    C. D. AUSTIN    2,299,002
PHOTOGRAPHIC APPARATUS
Filed June 14, 1939    2 Sheets-Sheet 2
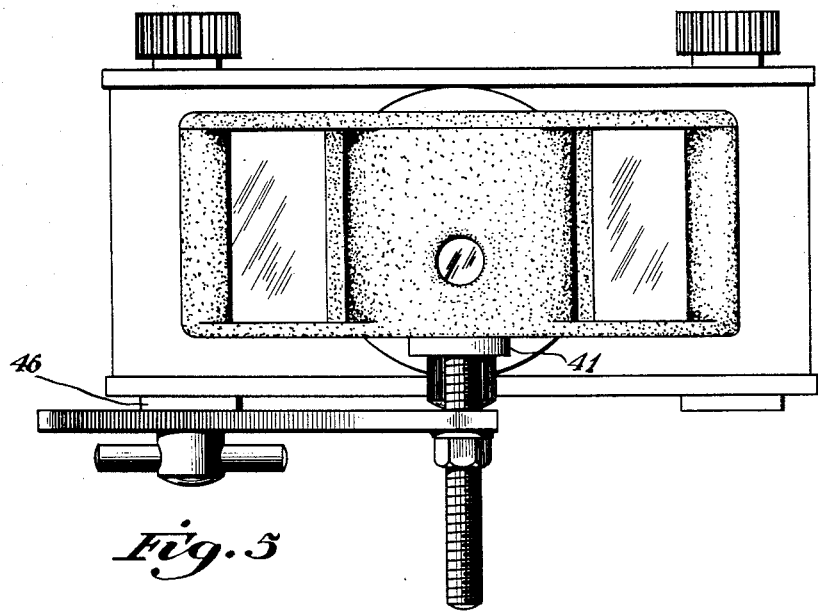
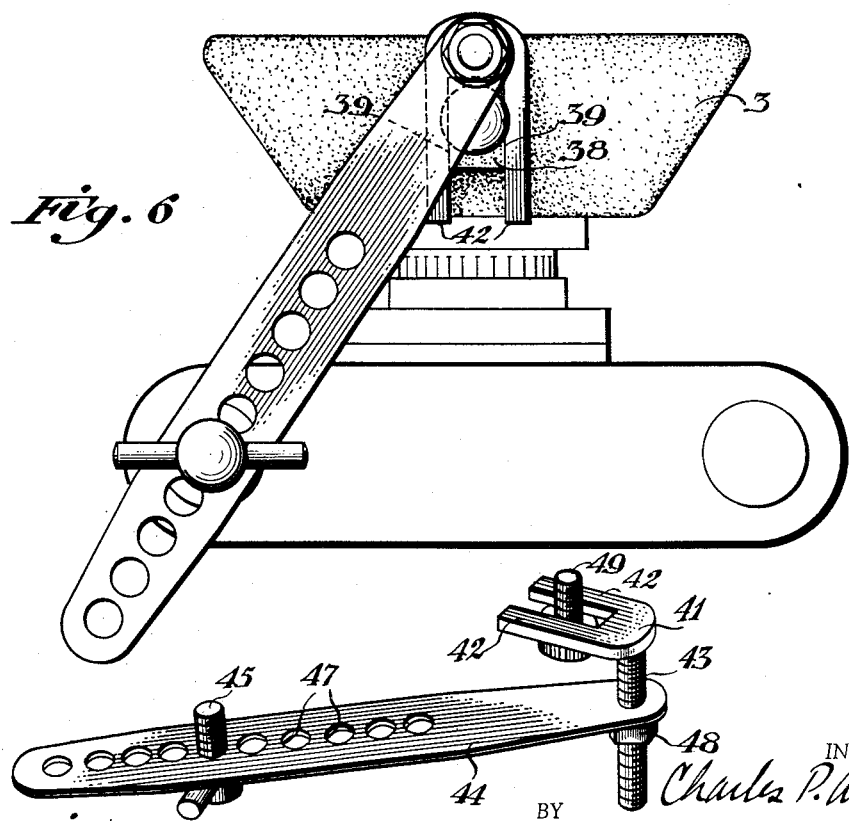
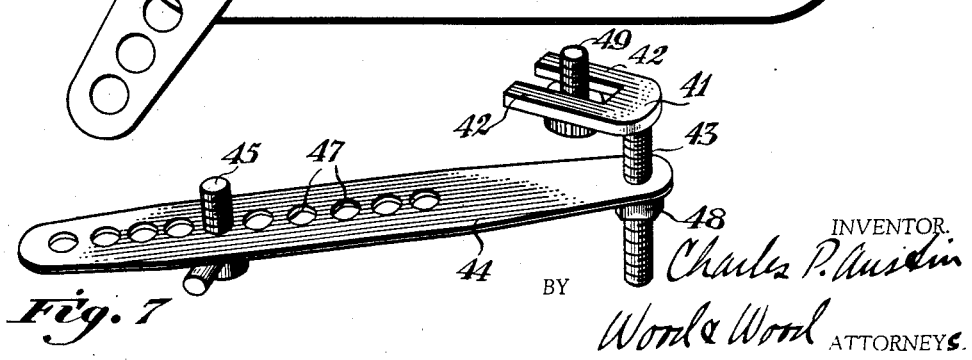
INVENTOR.
Charles P. Austin
BY Wood & Wood ATTORNEYS.

Patented Oct. 13, 1942

2,299,002

UNITED STATES PATENT OFFICE 2,299,002

PHOTOGRAPHIC APPARATUS

Charles D. Austin, Cincinnati, Ohio

Application June 14, 1939, Serial No. 279,144

2 Claims. (Cl. 95—18)

This invention relates to a device or attachment for enabling stereoscopic pictures to be made with a camera having a single lens. The device is intended for use in conjunction with profressional and amateur cameras, snapshot cameras, the so-called miniature or candid cameras or the like, and also for use in conjunction with movie camera equipment.

Briefly, one of the primary objectives of the present inventor has been to provide a simple and inexpensive apparatus which can be installed in front of the lens of a conventional camera for projecting images in stereoscopic relationship on the film behind the lens.

A further objective has been to provide an apparatus of simple construction which can be installed or attached readily to the camera and also dismounted very easily, so that the photographer may take two-dimensional or three-dimensional pictures easily and conveniently, depending upon the subject or upon his immediate desire.

Due to the fact that there are many different makes of cameras in use at the present time and the shape and construction of these is not uniform, it has been the objective to provide a relatively universal piece of apparatus which is capabale of being used with a variety of cameras.

Briefly, the present apparatus is predicated upon the principle of directing light onto photographic film so as to establish two images, side by side, of a single subject. The images represent the subject from slightly different points of view, that is, one image represents the subject viewed from a slightly different angle than the other image. These views are essentially the same as those seen by the eyes. Therefore, when these images, in turn, are viewed through lenses arranged to cause their convergence or merging to the eyesight, the effect of a third dimension, depth, is obtained. These general principles of photographic stereoscopy are old and well known in the art and are described here briefly to provide a background for the present advance.

Heretofore, stereoscopic pictures usually have been made by means of so-called stereoscopic cameras. These embodied pairs of lenses in spaced relationship so as to provide corresponding stereoscopic images. Such cameras are quite expensive (due to the double lenses and double shutters) and their usage is limited to the making of stereoscopic pictures only. Furthermore, the apparatus for synchronizing the shutters must be very precise and is quite delicate. Somewhat more recently, devices embodying prismatic reflectors have been proposed. However, the prisms of these devices, relatively speaking, have been as expensive to make as the pairs of lenses used in the old type stereoscopic cameras, and consequently, they have not been available to the majority of the present-day amateur photographers. Only a portion of the total amount of light from the subject passes through the prisms to the film, and, therefore, with such equipment either the aperture of the lens must be increased, or the film be exposed for a longer period of time. For these reasons, it is more difficult to make color photographs, or images of moving subjects with prismatic attachments. The problem in producing the present apparatus has been to obtain the optical fidelity, which is requisite for good stereoscopic vision, in apparatus which is suited for universal usage, inexpensive to construct and yet sufficiently strong and rigid so as not to become out of adjustment during ordinary handling and usage.

In the simplest terms, the device of the present invention is comprised of pairs of mirror reflectors positioned and housed rigidly in a casing, which is adapted to be disposed ahead of the single lens of a conventional camera. It has been determined that surface reflective mirrors provide optically clear images which are free of distortion and which are free of the so-called "ghost" images which would be obtained were mirrors of the conventional type employed. The mirrors do not exclude any of the light from the subject, and the attachment therefore does not detract from the speed of the lens with which the camera may be equipped.

Next, these mirrors are installed and mounted in channel ways, grooves, or locating buttresses provided within the housing and preferably formed integrally with it. It is recommended that the housing of the device be of moulded construction, made, for instance, of plastic compositions such as Bakelite, hard rubber, die-cast metal, or the like. By moulding the housing, accuracy in locating the mirror reflectors relative to one another and to the camera lens is predetermined.

The face of the housing contains a pair of apertures in spaced relationship, for the admission of light from the subject which is being photographed to the mirrors within the housing. The housing also is comprised of a central aperture in the rear face for the admission of the directed beams of light to the lens of the camera.

Adjacent the rear housing, a collar or other suitable device is employed for facilitating the attachment of the housing to the lens barrel of the camera. Lens barrels of the different makes of cameras which are available at the present time are of various diameters; to accommodate these different sizes, either centering screws or so-called adapter rings are provided.

For cameras of types upon which it is not convenient to attach the stereoscopic apparatus to the lens barrel, bracket apparatus is provided for connection of the stereoscope device either to the threaded tripod bore with which practically all cameras are equipped, or to the attachment clip with which certain cameras are provided.

In recent years the so-called miniature cameras have come to be used quite extensively. View finders are usually located in the body portions of these cameras, and these view finders, in some instances, may be obscured when the stereoscopic attachment is placed in front of the lens. In cameras of other types, the field of view indicated by the camera view finder is not the same as the field of view reproduced when the camera is equipped with the stereoscopic attachment. However, in the device of the present invention the space intermediate one pair of the reflectors is utilized for receiving and containing view finding elements. In this way, the view finding apparatus is embodied in the attachment itself without affecting the compactness and simplicity of the structure.

Further features of the invention and other objects are disclosed in the accompanying drawings, which illustrate a preferred embodiment of the invention, and in the following detailed description of the drawings.

In the drawings,

Figure 1 is a perspective view of the attachment installed upon a typical so-called candid camera.

Figure 2 is a cross-sectional view taken on the line 2—2 of Figure 1.

Figure 3 is a horizontal sectional view taken on the line 3—3 of Figure 2.

Figure 4 is a rearward elevation of the device.

Figure 5 is a front elevation of the stereoscopic attachment in place on the camera, illustrating the bracket mounting of the device secured in the tripod bore of the camera.

Figure 6 is a view looking upward at the bottom of the attachment, bracket and camera.

Figure 7 is a perspective view, illustrating the mounting bracket by itself.

In the drawings, the housing of the attachment is indicated generally at 1. This housing is comprised of upper and lower members 2 and 3 respectively, and right and left-hand side panels 4 and 5 extending between the upper and lower members. A rear panel 6 interconnects the side panels 4 and 5 and the upper and lower members, and contains a central aperture 7 for admission of light from the housing to the lens of a camera. The lens of the camera is indicated generally at 8, in Figure 3, while the film or plate or other light-sensitive material upon which the images are established is indicated at 9.

The forward face of the housing contains a pair of apertures 10—10, one for the right-hand image and one for the left. Intermediate these apertures, a wall 11, containing a view finding window 12, is positioned.

At the rearward terminals of the side panels, slots 13—13 are located, one for each side, while the forward edges of the side panels, at the portions adjacent the apertures 10 are configurated to constitute complementary slots 14—14. These slots are positioned to receive mirror elements 15—15, one for each side panel, that is, the mirrors are dimensioned to slide within the slots and be supported within them. Channel ways 16—16 preferably are also provided in the respective side panels 4 and 5 for the reception of wedges, spring elements, or cement, for holding the mirrors firmly in position, should the gauge of the glass of the mirrors be inaccurate.

Mirrors 15—15 are mounted to direct beams of light respectively to mirrors 17—17 which are positioned centrally in the housing, the latter members directing the light rearwardly through the lens 8 of the camera to the film 9. Mirrors 17—17 form a central V within the housing, with the meeting edges being mitered, as shown at 18; this construction permits the images to be formed directly side by side one another upon the film, with minimum spacing and with minimum loss of light. The forward edges of the mirrors reside in grooves 19, 19 which are formed in the central wall 11 intermediate the apertures 10, 10. A lower V boss 20 and an upper V boss 21 are provided for engagement with the rearward edges of the mirrors.

In the preferred structure, the lower portion of the housing, that is, the bottom member 3, the walls 4 and 5, the rear panel 6 and the forward panel 11 intermediate the apertures are of unitary moulded construction, with all of the grooves and channel ways being located accurately relatively to one another from a moulding die. The top member 2 is also of moulded construction and is arranged to fit over the lower portion and be fastened thereto by means of the screws 22. The lugs or bosses 20 and 21 may be moulded either upon the upper panel or upon the housing proper, as desired. This construction is adapted particularly for large-scale commercial production inasmuch as the reflectors are located automatically in accurate relationship to one another when mounted in the manner just described.

Mirrors 15 and 17 are comprised of plates of glass carrying metallic reflective surfaces. Metal, such as chromium, aluminum, silver, or suitable alloy is applied to the reflective surfaces of these mirrors in a manner well understood in the art. Ordinary polished plate glass is sufficiently optically flat to reflect the light without distortion. The mirrors may be bought in sheets of relatively large dimension and then cut to size and beveled roughly as shown in the drawings. None of the edge surfaces need be ground to a fine degree of finish since the edges, with the exception of the edges mitered as at 18, are housed within the supporting channel ways.

The mirrors are positioned angularly relative to one another to reflect light as shown by the dot and dash lines in Figure 3, whereby light entering the left-hand aperture is directed to form the right-hand image 23 upon the film, and vice versa, the left-hand image 24. In other words, the light is directed through the housing and the lens for transposition of the images upon the film.

When these transposed images are viewed with a typical stereoscope or projected on a screen and viewed with a suitable viewing device, a third-dimensional image is visible.

Therefore, in the preferred construction, the mirrors 15—15 may be placed 92° relative to one another, and the reflectors 17—17 may be placed centrally intermediate the mirrors 15—15 at an angle of 94° relative to one another, to obtain juxtaposition and adequate spacing of the images upon the photographic film. The angles are not critical though an appropriate angulation is essential to obtain good stereoscopic effects.

The mirrors 17 form a central V inwardly behind the forward panel 11. Members 25—25 extend rearwardly from the panel 11 in supporting engagement behind the mirrors. The members 25 contain grooves 26 similar to the grooves 16 in the side panels 4 and 5 for wedging or cementing the mirrors 17 in position. Within the well 27, which is formed intermediate the panel 11 and the support members 25—25, a mirror 28 is positioned so as to direct light from the aperture 12 up through an aperture 29 located in the top 2 of the housing. The top panel 2 is configurated to receive a ground glass plate 30 (Figure 2). Mirror 28 is supported upon an arm 31 of a V-shaped element 32 which is configurated to slide within the well 27. Arm 33 of the V-shaped element is located to lie adjacent the inner face of panel 11 and contains a bore 34 and a counterbore for positioning a lens 35 beyond the window 12 in the central panel. In the assembly of the device, the lens 35 is positioned in the counterbore of the V-shaped element 32, the mirror is cemented upon the arm 33 and the V-shaped element is then slid within the well and may be cemented in position if desired. By virtue of the lens 35 and the mirror 28, light entering the window 12 is focused upon the ground glass 30 and the relative faces of the apertures are adjusted so that the field of view is delineated upon the ground glass view screen.

At the rear of the housing, a threaded metal collar 36 is moulded in position centrally to surround the aperture 7. This collar is constructed to receive a conventional adapter ring 37 suitable for frictional contact with the lens barrel of a conventional camera. Such adapter rings for lens barrels of various sizes may be purchased readily in the camera shops. The collar 36 also may be bored and threaded radially for the reception of thumb screws for engagement with the lens barrel of a camera when adapter rings are not available.

In the embodiment of the invention which is shown in the drawings, the slots holding various mirrors are positioned so as to extend vertically within the housing. The mirrors are positioned within the slots and rest upon the bottom panel and are held in position by means of the top panel. If desired, the slots or suitable abutment lugs, or bosses, may extend from the top and bottom panels for supporting the reflectors horizontally of the housing. In this case, the top and bottom panels may be integral with the side panels and the rear member, and the front panel containing the apertures may be separable for insertion of the mirror elements. However, in either case, by virtue of the moulded construction, and particularly by virtue of the grooves or panel-ways for positioning the reflectors in the housing, the optical accuracy requisite for the production of good stereoscopic images readily may be obtained upon a commercial scale of production.

The bottom member 3 of the housing carries a boss 38 having parallel side walls 39—39 and a central bore 40. A support member 41 comprising a fork shaped element having arms 42—42 is provided for engagement with the boss 38, the arms 42—42 being positioned to embrace the side walls 39—39 of the boss. Support member 41 carries transversely a threaded rod 43. This rod engages a bracket arm 44—44 which is arranged to be attached to the camera itself by means of a screw 45 engaging the tripod bore of the camera. This latter bore usually is located in the base plate of the camera, for instance, in an element similar to the element 46 shown in Figure 5.

The screw 45 is disposed in one or a series of bores 47 within the bracket 44 so the position of the fork member 41 is adjustable relative to the lens of the camera. In place of the plurality of bores 47 a continuous slot may be provided.

The shaft 43 extending from the fork member 41 threadedly engages a bore in the forepart of the bracket 44. This shaft also carries a lock nut 48. This connection, therefore, provides for adjustability of the height of the fork relative to the base of the camera from which the bracket 44 is extended. Therefore, by adjusting either the lateral extension of the bracket from the base of the camera or by adjusting the vertical extension of the fork from the bracket, or by adjusting both, the stereoscopic attachment can be mounted centrally of the lens and rigidly to the camera regardless of the relative location of the lens relative to the base. For securing the stereoscopic attachment to the fork a thumb screw 49 passes through into threaded engagement with the bore 40.

In using the device, it is installed centrally in front of the lens of the camera. The camera is focused in the usual way and no particular precautions need be taken as to the axial position of the mirrors relative to the lens, except that they be located centrally of the lens in alignment with the film, to prevent misalignment of the images upon the film. The field of the stereoscopic images which will be provided is indicated upon the ground glass plate 30 in the upper panel of the device. With these adjustments made, the camera is operated in the usual way, and the film is exposed according to the usual exposure conditions.

The device may be used readily for the production of stereoscopic pictures with moving picture cameras. In this instance each "frame" of film in the picture is exposed to a pair of images and this film, in turn, may be viewed stereoscopically in the usual manner. The device also is suitable for installation upon an image projector. The film containing the stereoscopic images which were established by the device is installed in the projector, light is passed through the images and projector lens and is reflected by means of the mirrors out through the apertures 10—10 upon the projection screen. In other words, in these instances, the stereoscopic device is used in just the reverse manner in which it is used in making stereoscopic pictures. Further stereoscopic viewing apparatus is disclosed in my copending application Serial No. 336,423, which is a continuation in part of this application.

Having described my invention, I claim:

1. In a device of the class described, comprising a die-formed housing having a back member containing an aperture for the admission of light to a lens adjacent thereto, a front member containing a pair of apertures in spaced relationship for the reception of light from a subject, and pairs of reflectors in said housing and located relative to one another to direct light from said front apertures respectively through said rear aperture for the formation of stereoscopic images, means constituting channel ways in said housing for receiving said reflectors and supporting them marginally in said relative positions to one another and means intermediate said housing and said mirrors for exerting yielding pressure on said mirrors to maintain them in predetermined positions in said channel ways.

2. In a photographic device for producing stereoscopic images, comprising a housing containing a pair of apertures in spaced relationship in one face thereof and a central aperture in an opposing face thereof, means integral with the housing constituting grooves therein in pairs for slidably supporting opposite marginal edges of mirrors, the said means constituting the grooves being located to position said mirrors angularly relative to one another for reflection of light entering the said apertures of the pair through the housing and through the central aperture thereof for the production of stereoscopic images upon photographic film, the said housing containing resilient means positioned intermediate the grooves of each pair for pressing upon the rearward faces of mirrors inserted in the grooves to hold the mirrors in predetermined positions therein.

CHARLES D. AUSTIN.